Aug. 14, 1923.

H. P. PATHEAL

EXTENSION WHEEL RIM CONNECTOR

Filed Nov. 2, 1922

1,464,773

H. P. Patheal, Inventor

By C. A. Snow & Co.
Attorneys

Patented Aug. 14, 1923.

1,464,773

UNITED STATES PATENT OFFICE.

HERSCHEL P. PATHEAL, OF GREENVILLE, ILLINOIS.

EXTENSION WHEEL-RIM CONNECTOR.

Application filed November 2, 1922. Serial No. 598,555.

*To all whom it may concern:*

Be it known that I, HERSCHEL P. PATHEAL, a citizen of the United States, residing at Greenville, in the county of Bond and State of Illinois, have invented a new and useful Extension Wheel-Rim Connector, of which the following is a specification.

This invention relates to tractor wheels, and more particularly to extension treads or rims therefor.

The object of the invention is to provide simple and efficient means for attaching an extension either to the wheel rim or to the fender covering the wheel without necessitating the drilling of any holes in either the rim or the extension, and which is strong and rigid when applied.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
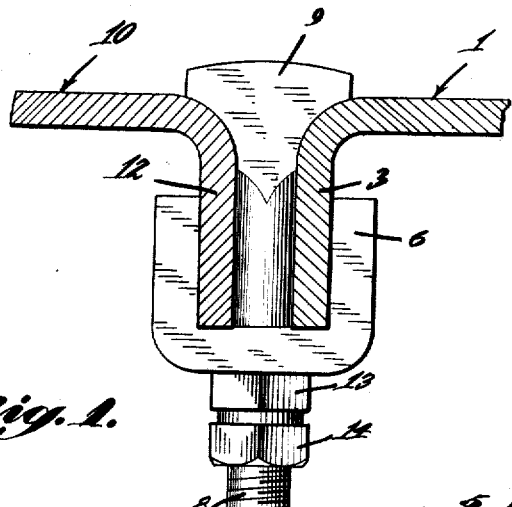
Figure 1 represents an enlarged transverse section through a portion of a wheel rim with this improvement applied.
Figure 3:
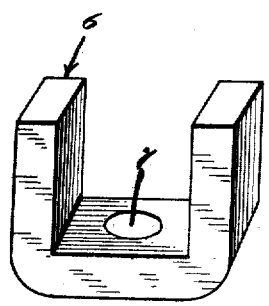
Fig. 3 is a detail perspective view of one member of the connector.

In the embodiment illustrated, a tractor wheel rim 1 is shown of ordinary construction having the usual traction elements 2 extended obliquely thereacross. To this rim 1, the extension 10 is connected to widen the tread of the wheel and this extension is here shown equipped with transversely arranged traction elements 11. The wheel rim 1 and the extension 10 are equipped with inturned right angularly extending flanges 3 and 12 respectively, and these flanges are connected by the connectors 5, constituting this invention.

Figure 2:
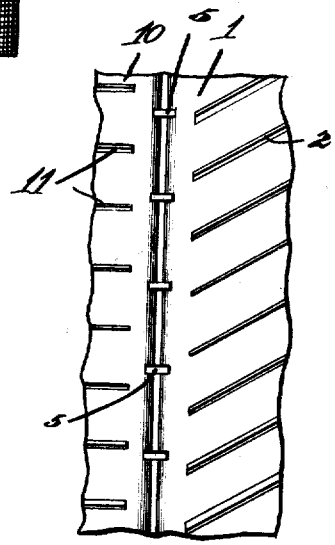
Fig. 2 is a plan view of a portion of the tread of the wheel rim and the extension connected by the device constituting this invention.
Figure 4:
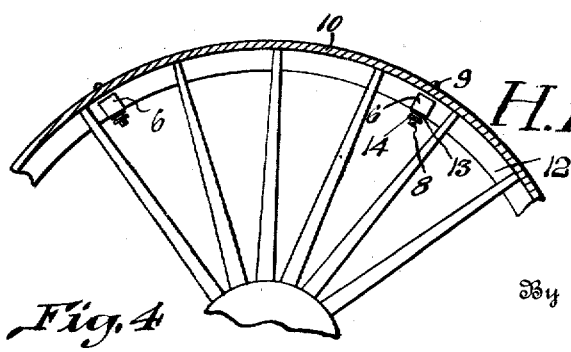
Fig. 4 is a side elevation of a portion of a wheel with the rim in section with the device constituting this invention shown applied.

It is to be understood that a plurality of these connectors are employed as is shown clearly in Fig. 2 and each comprises a U-shaped clip 6 of heavy metal which is designed to receive the flanges 3 and 12 of the rim and extension as is shown clearly in Fig. 1. The cross bar of this clip is apertured as shown at 7, to receive a bolt 8, the head 9 of which is substantially T-shaped or wedge-shaped in form so that when the nuts 13 and 14 are tightened, the bolt will be drawn between the flanges 3 and 12 and force them into locking engagement with the arms of the clip 6.

In the use of this invention, the extension rim 10 is arranged adjacent the wheel rim 1 and the clips 6 are arranged to straddle the flanges 3 and 12. The bolts 8 are then inserted between the flanges and given a quarter turn, after which the nuts 13 and 14 are tightened to draw the wedge-shaped bolt 8 down between the flanges which spreads them against the clip until a perfectly rigid connection is secured. It will of course be obvious that the connectors may be quickly removed by slightly loosening the nuts and giving the bolt a one quarter turn.

The use of these connectors eliminates the necessity of drilling holes in the rim and extension, and the strength thereof can be increased by increasing the size of the parts of the connector.

While these connectors are primarily intended for use in connecting extension rims to wheel rims of tractors, obviously, they may be used for any other purposes such as for connecting an extension to a wheel fender or the like.

Various changes in the form, shape, proportion and other minor details of construction may be made without departing from the principle or sacrificing any of the advantages of the claimed invention.

I claim:—

1. A connector for uniting extensions to wheel rims and the like comprising a U-shaped clip having parallel legs, a bolt extending between said legs and through the cross bar of the clip, said bolt having a substantially wedge-shaped head, and having means for tightening the bolt between the arms of the clip to secure the parts to be united thereby.

2. The combination with two flanged members to be connected, of a U-shaped clip for straddling the flanges of said members with said flanges extending into said clip, said clip having a bolt receiving aperture in the cross bar thereof, a bolt for insertion between said flanges, through said aperture and provided with a head having arcuate side faces to be drawn between the flanges to securely connect the members and means for drawing the bolt through the clip between the flanges.

In testimony that I claim the foregoing as my own, I have hereto affixed my signature in the presence of two witnesses.

HERSCHEL P. PATHEAL.

Witnesses:
A. C. DIXON,
C. K. DENNY, Jr.